United States Patent
Morris et al.

(10) Patent No.: US 9,062,725 B2
(45) Date of Patent: Jun. 23, 2015

(54) BRAKE ASSEMBLY

(75) Inventors: Jason Morris, Neath & Port Talbot (GB); Paul Roberts, Newport (GB); Norman Breakwell, Torfaen (GB); Peter K. Gibbens, Newport (GB); Martin P. Taylor, Newport (GB); Arvinash Ullagaddi, Bangalore (IN); Darshan Pateel, Bangalore (IN); Sanjeev Kulkarni, Bangalore (IN); Kishan Kumar Udupi, Karnataka (IN)

(73) Assignee: Meritor Heavy Vehicle Braking Systems (UK) Limited, Monmouthshire (GB)

( * ) Notice: Subject to any disclaimer, the term of this patent is extended or adjusted under 35 U.S.C. 154(b) by 10 days.

(21) Appl. No.: 13/240,189

(22) Filed: Sep. 22, 2011

(65) Prior Publication Data

US 2012/0073913 A1 Mar. 29, 2012

(30) Foreign Application Priority Data

Sep. 24, 2010 (GB) .................................. 1016013.3

(51) Int. Cl.
*B60T 1/06* (2006.01)
*F16D 55/02* (2006.01)
(Continued)

(52) U.S. Cl.
CPC ............ *F16D 55/226* (2013.01); *F16D 65/095* (2013.01); *F16D 2055/0008* (2013.01)

(58) Field of Classification Search
CPC .............. F16D 65/0006; F16D 65/092; F16D 65/0971; F16D 65/095; F16D 2121/06; F16D 2055/0008; F16D 2055/0041; F16D 2055/007; F16D 55/226; F16D 55/227; F16D 55/2262; F16D 55/22655

USPC ............... 188/72.1, 73.44, 73.39, 73.31, 370, 188/205 R, 250 B, 250 F, 73.43
See application file for complete search history.

(56) References Cited

U.S. PATENT DOCUMENTS 3,920,104 A * 11/1975 Hoffmann .................. 188/73.31
4,068,744 A 1/1978 Markert
(Continued)

FOREIGN PATENT DOCUMENTS

EP 0752541 A1 1/1997
GB 2236816 A 4/1991
(Continued)

OTHER PUBLICATIONS

European Search Report for European Patent Application No. 11180816 completed Dec. 8, 2011.
(Continued)

*Primary Examiner* — Anna Momper
*Assistant Examiner* — San Aung
(74) *Attorney, Agent, or Firm* — Brooks Kushman P.C.

(57) ABSTRACT

A disc brake assembly includes a brake pad having a first pad abutment spaced from a second pad abutment and a third pad abutment positioned between the first pad abutment and the second pad abutment. An actuator is operable to apply a force to the brake pad to apply the brake. The disc brake assembly has a first reaction abutment facing the first pad abutment, a second reaction abutment facing the second pad abutment, and a third reaction abutment facing the third pad abutment. The first, second and third pad abutments are operable to transfer brake pad drag torque to the first, second and third reaction abutments respectively. The disc brake is configured such that under no load conditions with the third pad abutment engaging the third reaction abutment, the first pad abutment is spaced from the first reaction abutment.

15 Claims, 3 Drawing Sheets

(51) Int. Cl.
  *F16D 55/226* (2006.01)
  *F16D 65/095* (2006.01)
  *F16D 55/00* (2006.01)

(56) References Cited

U.S. PATENT DOCUMENTS

| | | | |
|---|---|---|---|
| 4,915,198 A | | 4/1990 | Hirashita |
| 5,025,897 A | * | 6/1991 | Hirashita et al. ............ 188/73.38 |
| 6,039,155 A | * | 3/2000 | Demoise, Jr. ................ 188/73.39 |
| 6,250,440 B1 | | 6/2001 | Mery et al. |
| 2001/0013448 A1 | * | 8/2001 | Schorn et al. ................ 188/71.1 |
| 2004/0154885 A1 | | 8/2004 | Gotti |
| 2006/0060431 A1 | | 3/2006 | Schog |
| 2006/0076198 A1 | * | 4/2006 | Thiel ........................... 188/73.43 |

FOREIGN PATENT DOCUMENTS

| | | | | |
|---|---|---|---|---|
| JP | 57040128 A | * | 3/1982 | ............ F16D 55/224 |
| JP | 8177898 | | 7/1996 | |
| JP | 8177898 A | | 12/1996 | |
| WO | 9950566 A1 | | 10/1999 | |
| WO | 2004010020 A1 | | 1/2004 | |

OTHER PUBLICATIONS

GB Search Report dated Jan. 25, 2011.

* cited by examiner

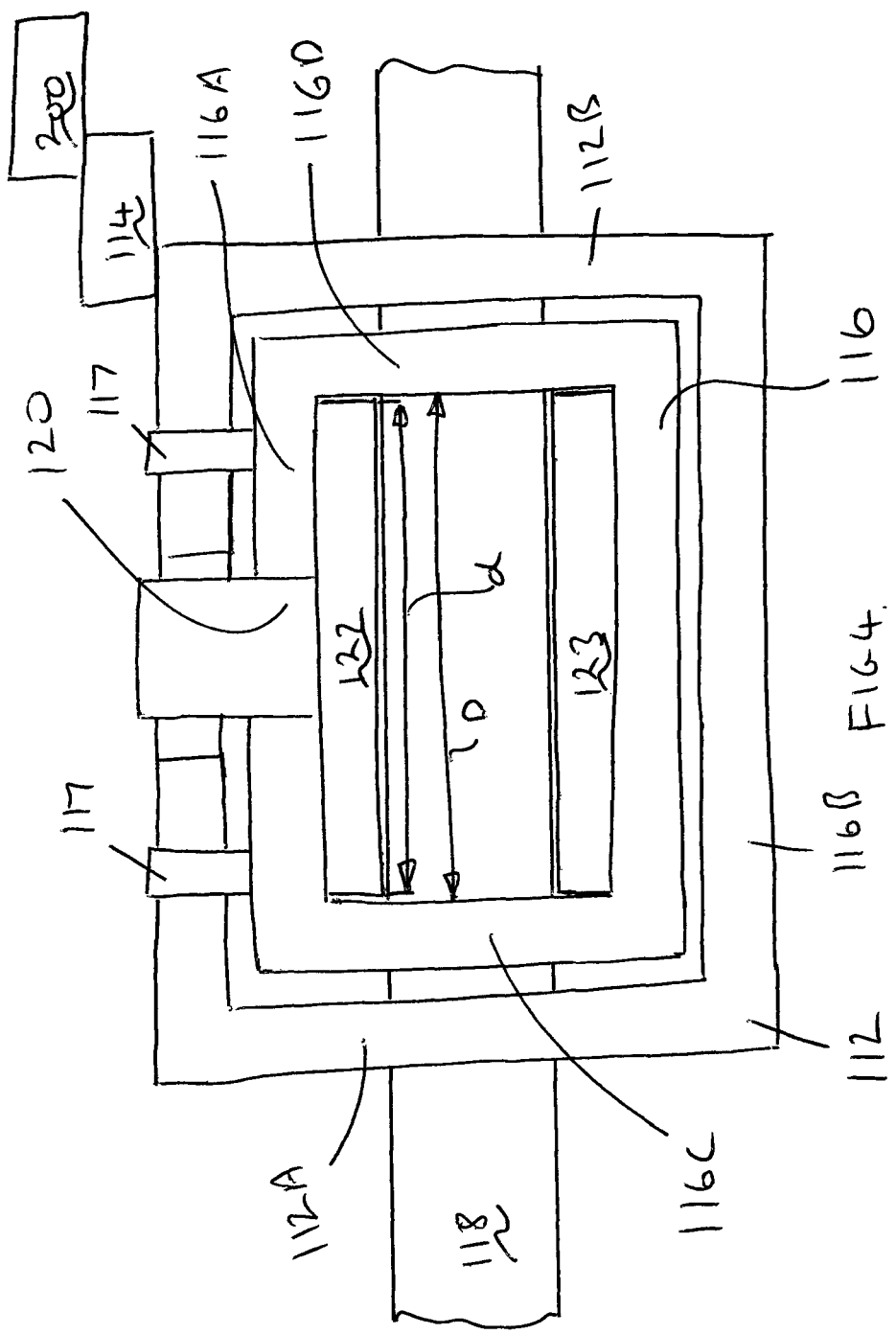

BRAKE ASSEMBLY

RELATED APPLICATION

This application claims priority to GB Application 1016013.3, which was filed Sep. 24, 2010.

TECHNICAL FIELD

The present invention relates to a disc brake assembly, in particular a disc brake assembly for use with a heavy land vehicle, such as a lorry or a truck.

BACKGROUND OF THE INVENTION

Known trucks typically use drum brakes or disc brakes, or a combination of drum and disc brakes, to slow the vehicle when required.

EP1473481 shows a known disc brake assembly that has a carrier with just a leading edge abutment and a trailing edge abutment for each brake pad. When the associated vehicle is travelling in a forward direction, the brake is applied and the brake pad drag torque on the inboard brake pad is reacted entirely by the abutment on the trailing edge of the carrier. When the vehicle is travelling in a reverse direction, the brake is applied and the brake pad drag torque on the inboard pad is reacted entirely by the abutment on the leading edge of the carrier. This is the case when the brakes are applied relatively lightly or relatively heavily.

US2006/0060431 shows a light vehicle caliper which is hydraulically operated. The arm of the caliper passes over the top of the brake pads, and in order to remove and replace the brake pads the caliper must be removed from the vehicle.

Trucks have a primary direction of movement, i.e. they primarily travel in a forward direction, and as such the brakes operate almost exclusively when the vehicle is travelling in a forward direction. While the vehicle can travel in a reverse direction, this typically occurs only occasionally and when it does so the vehicle will be travelling at a low speed thereby causing very little wear on the brake pads/shoes.

When a disc brake assembly is fitted to such a truck, a brake disc rotates within a space created between two brake pads. Because the vehicle has a primary direction of travel, each brake pad has a leading edge and a trailing edge, i.e. when the vehicle is travelling in the forward direction a point on the brake disc friction surface will approach the leading edge of the pad first, then pass under the brake pad and depart from the trailing edge of the pad.

The brake pad typically includes a friction material attached to a brake pad backplate. Clearly, when the brake is applied, a drag torque is created at the interface between the disc friction surface and the pad friction surface. This drag force is typically reacted by the brake pad backplate near the trailing edge of the pad.

When new, typically the brake pad backplate is flat and the brake pad friction material will be of constant thickness. In some brakes the friction material can tend to wear unevenly, in particular it can wear in a taper fashion with the leading edge wearing faster than the trailing edge, i.e. in a tangentially tapered fashion. This results in a brake pad becoming unusable (i.e. worn out) earlier than it might otherwise become had it worn in a parallel, i.e. non taper fashion.

The present invention seeks to mitigate or at least partially mitigate the problem of taper wear on brake pads.

SUMMARY OF THE INVENTION

A disc brake assembly includes a brake pad having a first pad abutment spaced from a second pad abutment, and a third pad abutment positioned between the first pad abutment and the second pad abutment.

An actuator is operable to apply a force to the brake pad to apply the brake. The disc brake assembly has a first reaction abutment facing the first pad abutment, a second reaction abutment facing the second pad abutment, and a third reaction abutment facing the third pad abutment. The first, second, and third pad abutments are operable to transfer brake pad drag torque to the first, second, and third reaction abutments respectively. The disc brake is configured such that under no load conditions, with third pad abutment engaging the third reaction abutment, the first pad abutment is spaced from the first reaction abutment.

Advantageously, by providing three pad abutments for transferring brake pad drag torque, it allows each pad abutment to transfer brake pad drag torque under certain circumstances. By positioning the third pad abutment between the first and second pad abutments, the third pad abutment can be utilized to transfer drag torque under relatively low braking forces when the vehicle is travelling in a forward direction. The third and first pad abutments can be utilized to transfer brake torque when the brakes are being applied relatively heavily with the vehicle travelling in the forward direction. The second pad abutment can be used to transfer brake torque when the vehicle is travelling in a reverse direction. Such an arrangement reduces leading edge taper wear when the brakes are applied relatively lightly (due to the relative position of the first, second, and third pad abutments, i.e. the third pad abutment being positioned between the first and second pad abutments), and hence reduces leading edge taper wear over the life of the brake pad. By providing the third pad abutment between the first pad abutment and the second pad abutment, it creates a relatively short brake pad which is generally advantageous. When such a brake pad is used in conjunction with a slideably mounted brake caliper having circumferentially spaced arms, which connect an inboard part of the brake caliper to an outboard part of the brake caliper, and when the brake pad is installed in or removed from the disc brake assembly by inserting/removing from between the brake arms a relatively short brake pad, it allows the arms to be relatively circumferentially close together. This is advantageous since it allows for a compact caliper.

The third pad abutment may be circumferentially between the first and second pad abutments.

The disc brake assembly may include a brake caliper slideably mounted on a brake carrier and in which the first reaction abutment and/or the second reaction abutment and/or the third reaction abutment is provided on the brake carrier.

The brake caliper may include a first side portion connected to a second side portion by two bridge arms, the bridge arms being circumferentially spaced apart by a distance sufficient to allow the brake pad to be installed in or removed from the disc brake assembly.

In one embodiment two pins are provided to allow the brake caliper to be slideably mounted on the brake carrier. Each pin may be mounted on the caliper and be slideable in a hole in the carrier, or may be mounted on the carrier and be slideable in a hole in the caliper.

A method of operating a disc brake assembly includes operating the brake such that the force is relatively low, thereby generating a relatively low circumferential drag force on the pad. Further steps include: reacting the relatively low circumferential drag force substantially entirely at the third reaction abutment alone; operating the brake such that the force is relatively high, thereby generating a relatively high circumferential drag force on the brake pad; and reacting the relatively high circumferential drag force substantially entirely at the third reaction abutment and at the first reaction abutment.

The method may include mounting the brake assembly on a vehicle having a primary direction of movement, applying the brake when the vehicle is travelling in the primary direction of movement such that the relatively low circumferential drag force is reacted substantially entirely at the third reaction abutment and the relatively high circumferential drag force is reacted substantially entirely at the third reaction abutment and at the first reaction abutment.

Vehicles having a primary direction of movement define a leading edge and a trailing edge of the brake pads, which in turn defines a leading edge side and a trailing edge side of the actuator (and any associated piston). In one embodiment, the third reaction abutment may be offset on the leading edge side of the piston. In another embodiment, the third reaction abutment may be offset on the trailing edge side of the piston.

The actuator may be mounted on the first side. The brake pad may be mounted on the first side.

Advantageously, the third abutment may be relatively circumferentially close to the line of action of the actuator when it applies the force to the brake pad.

BRIEF DESCRIPTION OF THE DRAWINGS

The invention will now be described, by way of example only, with reference to the accompanying drawings in which:

FIG. 4 is a schematic view of FIG. 2.

DETAILED DESCRIPTION

Figure 1:
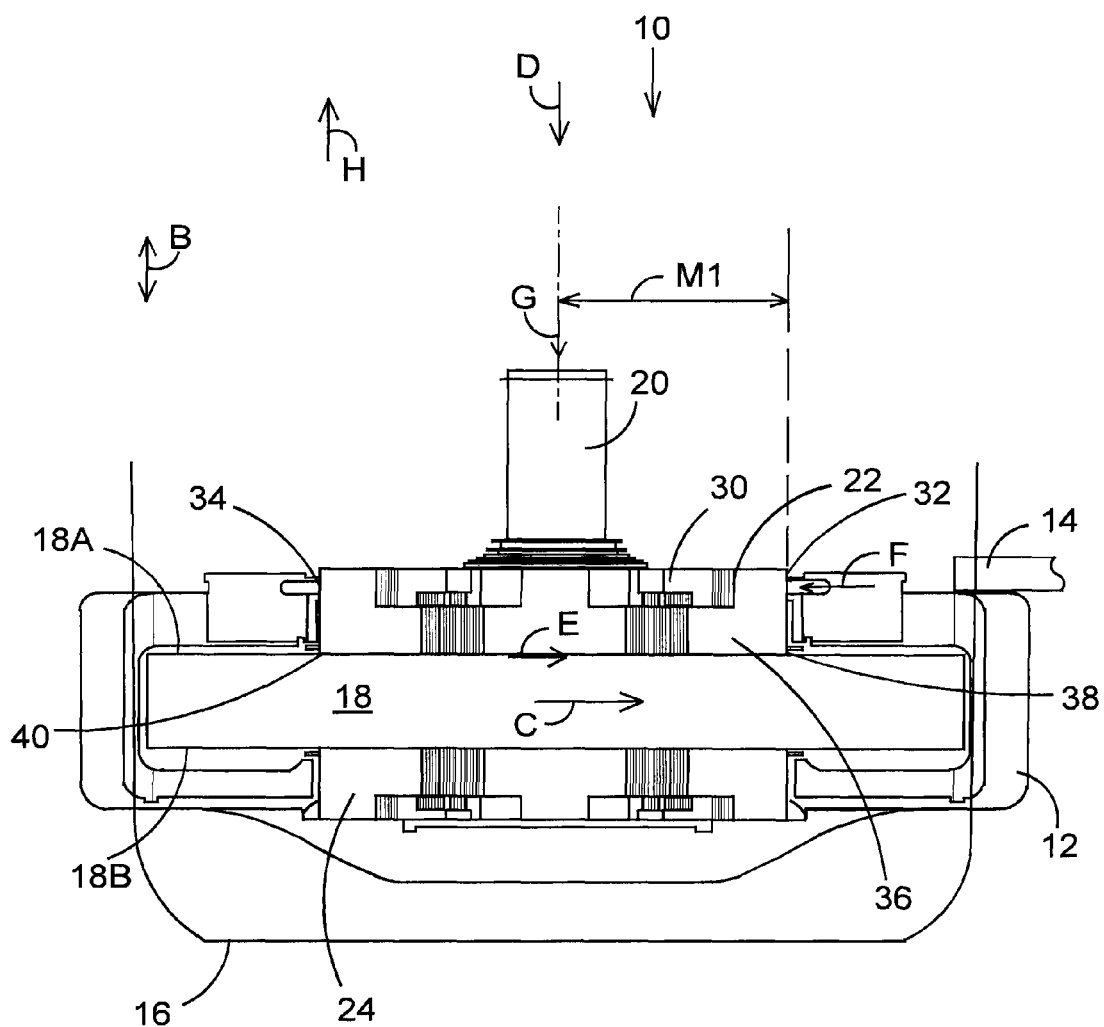
FIG. 1 is a plan view of a known disc brake assembly.

With reference to FIG. 1 there is shown a known brake assembly 10 having a carrier 12 mounted on a vehicle suspension component 14 (shown schematically). A caliper 16 is slideably mounted on the carrier for movement in the direction of arrow B. A brake disc (also known as brake rotor) 18 is rotatably mounted on the suspension component and rotates with an associated wheel. When the vehicle is travelling in the forward direction the brake disc rotates in the direction of arrow C.

An actuator mechanism is mounted in the brake assembly.

The brake assembly includes an inboard brake pad 22 and an outboard brake pad 24. The inboard brake pad 22 includes an inboard brake pad backplate 30 having a trailing edge abutment 32 and a leading edge abutment 34.

Attached to the inboard brake pad backplate is an inboard brake pad friction material 36 having a trailing edge 38 and a leading edge 40.

When the brake is applied the actuator mechanism causes the piston 20 to move in the direction of arrow D. This forces the inboard brake pad 22 in the direction of arrow D whereupon it engages the inboard friction surface 18A of the brake disc 18. Continued application of the brake then causes the caliper 16 to move in the direction of arrow H which causes the outboard brake pad 24 to also move in the direction of arrow H resulting in the outboard brake pad 24 engaging the outboard friction surface 18B. Continued application of the brake clamps the brake disc 18 between the inboard and outboard brake pads thereby slowing the rotational movement of the brake disc 18, and hence slowing the vehicle.

As the brake is applied, the actuator mechanism applies a force to the piston 20 in the direction of arrow G and a circumferential brake pad drag torque is created between the brake disc 18 and inboard brake pad 22. This brake pad drag torque acts in the direction of arrow E on the brake pad. This brake pad drag torque is reacted at the trailing edge abutment 32 in the direction of arrow F.

The center line of the piston is offset from the trailing edge abutment 32 by distance M1. As the brake is progressively applied, the inboard brake pad moves in the direction of arrow D and the brake pad drag torque E creates friction at the interface between the trailing edge abutment 32 and the associated reaction abutment on the carrier 12. Continued application of the brake results in the piston applying a turning moment in an counterclockwise direction when viewing FIG. 1, the moment arm being distance M1. It is this turning moment that creates leading edge taper wear.

Figure 2:
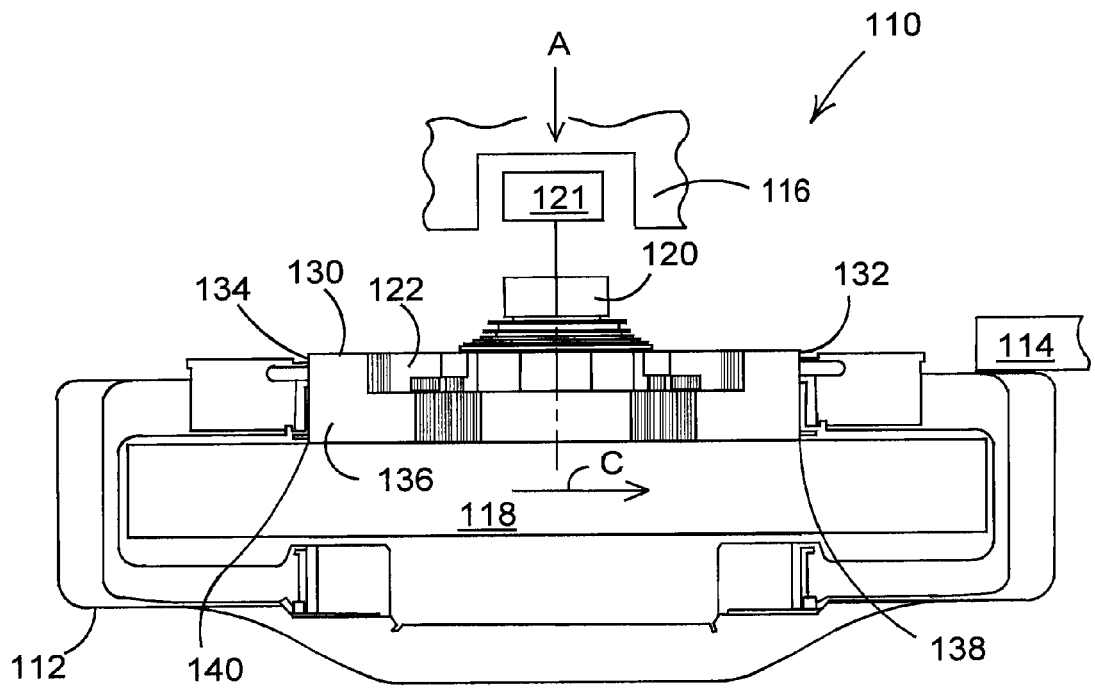
FIG. 2 is a plan view of part of a disc brake assembly according to the present invention.
Figure 3:
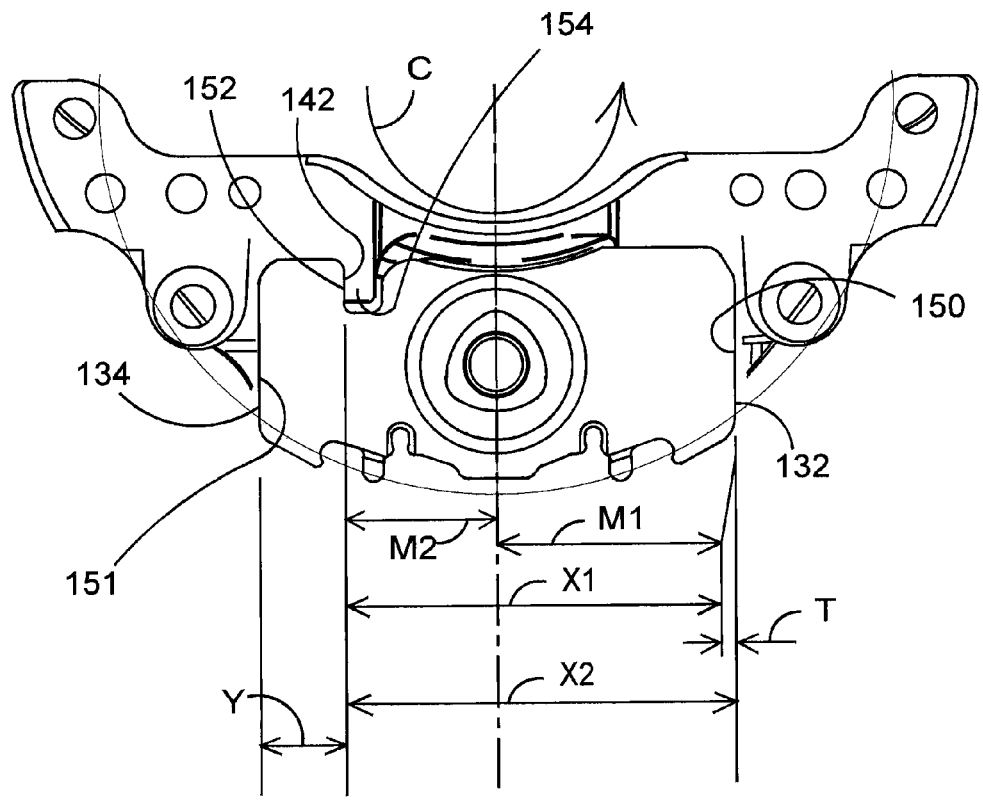
FIG. 3 is a view taken in the direction of arrow A of FIG. 2.

With reference to FIGS. 2 and 3 there is shown a brake assembly 110 including a carrier 112 (shown schematically), a vehicle suspension component 114 (shown schematically), a caliper 116 (shown schematically), and a brake disc 118 (shown schematically).

The brake assembly 110 includes an actuator mechanism 121 (shown schematically). The actuator mechanism includes a piston 120 (only part of which is shown). The brake assembly includes an inboard brake pad 122 having an inboard brake pad backplate 130 having a trailing edge abutment 132 and a leading edge abutment 134. The inboard brake pad includes an inboard brake pad friction material 136 having a leading edge 140 and a trailing edge 138. Brake assembly 110 includes outboard brake pad 123 (see FIG. 4). When the associated vehicle is travelling in a forward direction the brake disc 118 rotates in the direction of arrow C (see FIGS. 2 and 3).

The inboard brake pad backplate also includes a further abutment (also known as a third abutment) 142.

The trailing edge abutment 132 (also known as first abutment) faces a first reaction abutment 150 of the carrier 112. The leading edge abutment 134 (also known as a second abutment) of the inboard brake pad backplate faces a second reaction abutment 151 of the carrier 112. The further abutment 142 of the inboard brake pad backplate faces a third reaction abutment 152 of the carrier 112.

Both the trailing edge abutment 132 and the further abutment 142 face in opposite direction to the leading edge abutment 134. Thus, trailing edge abutment 132 and further abutment 142 face to the right hand side when viewing FIG. 3 and the leading edge abutment 134 faces to the left when viewing FIG. 3. It will also be appreciated that the trailing edge abutment 132 and the further abutment 142 face away from the direction in which the leading edge abutment 134 faces. Thus, as shown in FIG. 3, the trailing edge abutment 132 and further abutment 142 both face right when viewing FIG. 3 and are both positioned on the right hand side of the leading edge abutment 134.

The trailing edge abutment 132 and leading edge abutment 134 are positioned on circumferential ends of the brake pad.

The distance X1 between the further abutment 142 and the trailing edge abutment 132 is slightly smaller than the distance X2 between the third reaction abutment 152 and the first reaction abutment 150. This is best seen in FIG. 3, and note that the difference in the distance has been exaggerated so as to aid explanation. The difference in distances X1 and X2 will depend upon the particular circumstances but examples may be 0.5 mm and 1.0 mm as a difference between the distances X1 and X2.

The further abutment 142 is formed in a notch on the inboard brake pad backplate 130.

As will be appreciated from FIG. 3, the trailing edge abutment 132 is offset by distance M1 from the center of the piston 120 to the trailing side of the brake pad. However, the further abutment 142 is offset from the center line of the piston by distance by M2, a distance smaller than M1. Furthermore, the further abutment 142 has been offset on the leading edge side of the pad relative to the piston.

The third reaction abutment 152 is formed on the carrier 112. In this case the third reaction abutment 152 is formed on a surface of a canter lever arm or peg 154. This case arm 154 is integral with the carrier, though in further embodiments this need not be the case.

Operation of the brake is as follows:

General operation of the brake is as described with regard to the prior art. However, the brake pad drag torque is reacted differently, depending upon how hard the brake is applied.

Vehicle Travelling in Forwards Direction, Brakes Applied Relatively Lightly

If the brakes are applied relatively lightly, then relatively little amount of deflection occurs in the carrier and caliper. In particular, a relatively small amount of deflection occurs on arm 54. Thus, when the brakes are applied relatively lightly, the brake pad drag torque applied to the inboard brake pad is reacted by the third reaction abutment 152 alone. In the rest position, because, as described above, distance X1 is smaller than distance X2, the trailing edge abutment 132 is separated from the first reaction abutment 150 by distance T. If the brake is applied relatively lightly, while the arm 154 may deflect slightly to the right when viewing FIG. 3, nevertheless it will deflect less than distance T, and under these circumstances the trailing edge abutment 132 will not come into engagement with the first reaction abutment 150. Under these circumstances the brake drag torque will be reacted by the third reaction abutment 152 alone. Because the third reaction abutment 152 is offset from the piston center line by distance M2, which is smaller than M1, then the turning moment arm is smaller. Furthermore, because the third reaction abutment 152 is offset on the leading edge side of the piston, the turning moment is in the opposite sense to the prior art, i.e. when the brake is applied relatively lightly, the turning moment tends to cause the inboard brake pad to rotate clockwise when viewing FIG. 2.

Vehicle Travelling in Forwards Direction, Brakes Applied Relatively Heavily

When the vehicle is travelling in the forward direction and the brakes are applied relatively heavily, then a higher brake pad drag torque is created sufficiently high to cause arm 154 to deflect at least by a distance equivalent to distance T. Under these circumstances the gap between trailing edge abutment 132 and the first reaction abutment 150 will close and the brake pad drag torque will be reacted in two places, namely at the third reaction abutment 152 and also at the first reaction abutment 150. The turning moment will then be a combination of clockwise moment generated by the further abutment 142 and the counterclockwise moment generated by the trailing edge abutment 132. Depending upon how hard the brakes are applied, the gross moment on the pad may be clockwise, neutral, or counterclockwise.

Vehicle Travelling in Reverse, Brakes Applied

When the vehicle is travelling in reverse and the brakes are applied, either relatively hard or relatively soft, the brake pad drag torque is reacted at the second reaction abutment 151.

For ease of explanation, in the description above it has been assumed that all of the brake pad drag torque is reacted at the first reaction abutment, second reaction abutment, and third reaction abutment as the particular circumstances dictate. In practice, relatively small amounts of brake pad drag torque can be reacted elsewhere. Thus, small amounts of brake pad drag torque can be reacted at the interface between the piston and the brake pad backplate, at the interface between radially inner edge of the brake pad backplate and the carrier, and at the interface between the brake pad retaining spring (not shown) and the brake pad retaining strap (not shown). However, these alternative reaction points only amount to a very small percentage of brake pad drag torque, and as such, brake pad drag torque is substantially entirely reacted by the first reaction abutment, second reaction abutment, and third reaction abutment as circumstances dictate. By analogy with regard to the prior art, the brake pad drag torque of the inboard brake pad 22 is reacted substantially entirely by that part of the carrier facing trailing edge abutment 32 when the vehicle is travelling in the forward direction and the brake pad drag torque is substantially entirely reacted by that part of the carrier facing the leading edge abutment 34 when the vehicle is travelling in reverse.

As described above, the third reaction abutment is offset on the leading edge side of the piston, though in other circumstances it may be offset on the trailing edge side of the piston. As described above the actuator mechanism includes a single piston. In further embodiments, two or more pistons may be utilized. As described above, the third reaction abutment is provided on the inboard side of the brake pad, i.e. on the actuator side of the brake assembly. In further embodiments, a third reaction abutment may be provided on the outboard side of the brake assembly (when considering the rotor) for use with the outboard brake pad. As described above, the third reaction abutment has been provided on the carrier. In embodiments where the brake torque may be transferred directly to the caliper, then the third reaction abutment may be provided on the caliper. As described above, the third abutment 142 is closer to the leading edge abutment 134 (see distance Y) than it is to the trailing edge abutment 132 (see distance X1). In further embodiments, the third abutment could be closer to the trailing edge abutment than the leading edge abutment. In further embodiments, the third abutment may be equidistant from the trailing edge abutment and the leading edge abutment.

Attention is drawn to features 20A and 20B of EP1473481. Under no circumstances do these features transfer brake pad drag torque to the carrier, rather they simply reduce the likelihood of misassembly of the brake pads.

Replacement of Brake Pads

FIG. 4 shows a schematic view of the brake disc assembly of FIG. 2. The caliper 116 is slideably mounted via pins 117 on the carrier 112. The carrier is mounted on a suspension component 114 of a vehicle 200. The caliper has a first side portion 116A connected to a second side portion 116B by bridge arms 116C and 116D. The bridge arms 116C and 116D are spaced apart by a distance D which is slightly larger than the distance d between the ends of the brake pads 122 and 123.

Thus, when the brake pads 122 and 123 have become worn, they can be removed radially outwardly (in the direction of the viewer when viewing FIG. 4), and can be replaced with newer brake pads which are inserted radially inwardly (into the paper when viewing FIG. 4) without having to remove either the caliper 116 or the carrier 112 from around the brake disc 118. In other words, the brake pads can be removed and replaced while the caliper and carrier are correctly positioned around the brake disc 118. This is significant when dealing with heavy vehicle brake assemblies since the calipers and carriers of such assemblies are relatively heavy and cannot be manipulated by a single operator. For these reasons brake assemblies of heavy vehicles are designed such that the brake pads can be removed and replaced without having to disturb the carrier or caliper. Accordingly, by providing a relatively short brake pad, it means that the carrier arms 116C and 116D can be spaced apart by a relatively short distance, and this in turn means that arms 112A and 112B of the carrier can also be spaced apart by a relatively short distance thereby providing a compact brake assembly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A disc brake assembly for a vehicle, the vehicle having a primary direction of movement, the disc brake assembly including:
    a brake pad having a first pad abutment spaced from a second pad abutment, and a third pad abutment positioned between the first pad abutment and the second pad abutment;
    an actuator operable to apply a force to the brake pad to apply the disc brake assembly;
    a first reaction abutment facing the first pad abutment, a second reaction abutment facing the second pad abutment, and a third reaction abutment facing the third pad abutment, the first reaction abutment and third reaction abutment extending substantially parallel to the third reaction abutment; and
    said first, second and third pad abutments being operable to transfer brake pad drag torque to the first, second and third reaction abutments respectively, the disc brake assembly being configured such that under no load conditions with the third pad abutment engaging the third reaction abutment, the first pad abutment is spaced from the first reaction abutment, and
    wherein the disc brake assembly is configured such that applying the brake when the vehicle is traveling in the primary direction of movement, braking with a first force resulting in a first circumferential drag force on the brake pad is reacted substantially entirely at the third reaction abutment alone, and braking with a second force higher than the first force and resulting in a second circumferential drag force on the brake pad that is higher than the first circumferential drag force is reacted at both the third reaction abutment and the first reaction abutment.

2. The disc brake assembly as defined in claim 1, wherein the brake pad includes friction material having a first circumferential end and a second circumferential end, and wherein the third pad abutment is positioned circumferentially between the first circumferential end and the second circumferential end.

3. The disc brake assembly as defined in claim 1, wherein the third pad abutment is positioned proximate the second pad abutment and remote from the first pad abutment.

4. The disc brake assembly as defined in claim 1, wherein the first pad abutment faces away from the second pad abutment and the third pad abutment faces away from the second pad abutment.

5. The disc brake assembly as defined in claim 1, wherein the first pad abutment and/or second pad abutment is positioned at a circumferential end of the brake pad.

6. The disc brake assembly as defined in claim 1, wherein the third pad abutment is defined by a notch in the brake pad.

7. The disc brake assembly as defined in claim 1, wherein the third pad abutment is on a radially inner portion of the brake pad.

8. The disc brake assembly as defined in claim 1, wherein the actuator includes a single piston operable to apply a force to the brake pad.

9. The disc brake assembly as defined in claim 1, including a brake caliper slideably mounted on a brake carrier, and wherein the first reaction abutment and/or the second reaction abutment and/or the third reaction abutment is provided on the brake carrier.

10. The disc brake assembly as defined in claim 9, wherein the brake caliper includes a first side portion connected to a second side portion by two bridge arms, the bridge arms being circumferentially spaced apart by a distance sufficient to allow the brake pad to be installed in, or removed from, the disc brake assembly.

11. The disc brake assembly as defined in claim 1, wherein the third reaction abutment is provided on a cantilevered arm.

12. The disc brake assembly as defined in claim 1, wherein a distance between the first and third pad abutments is less than a distance between the first and third reaction abutments.

13. A method of operating a disc brake assembly for a vehicle, the vehicle having a primary direction of movement, the method including the steps of:
    providing a disc brake assembly including a brake pad having a first pad abutment spaced from a second pad abutment, and a third pad abutment positioned between the first pad abutment and the second pad abutment, an actuator operable to apply a force to the brake pad to apply the disc brake assembly, a first reaction abutment facing the first pad abutment, a second reaction abutment facing the second pad abutment, and a third reaction abutment facing the third pad abutment, the disc brake assembly being configured such that under no load conditions with the third pad abutment engaging the third reaction abutment, the first pad abutment is spaced from the first reaction abutment and the first reaction abutment extending substantially parallel to the third reaction abutment;
    when operating the brake when the vehicle is traveling in the primary direction of movement with a first force, thereby generating a first circumferential drag force on the brake pad, reacting said first circumferential drag force substantially entirely at the third reaction abutment alone; and
    when operating the brake when the vehicle is traveling in the primary direction of movement with a second force higher than the first force, thereby generating a second circumferential drag force on the brake pad higher than the first circumferential drag force, reacting said second drag force at both the third reaction abutment and at the first reaction abutment.

14. The method of operating a brake as defined in claim 13, including mounting the brake assembly on the vehicle.

15. The method of installing or removing the brake pad of claim 13, including the steps of providing a brake caliper and brake carrier on a vehicle with a brake disc positioned between a first side portion and a second side portion of the caliper, and installing or removing the brake pad from the disc brake assembly while a brake disc is positioned between the first side portion and the second side portion.

* * * * *